United States Patent [19]

Derving

[11] Patent Number: 4,877,160
[45] Date of Patent: Oct. 31, 1989

[54] VALVE UNIT

[75] Inventor: Jackie Derving, Malmö, Sweden

[73] Assignee: Tetra Pak International AB, Lund, Sweden

[21] Appl. No.: 330,999

[22] Filed: Mar. 29, 1989

Related U.S. Application Data

[63] Continuation of Ser. No. 358,705, Mar. 16, 1982, abandoned.

[30] Foreign Application Priority Data

Apr. 1, 1981 [SE] Sweden ................................ 8102088

[51] Int. Cl.$^4$ .............................................. B67D 5/72
[52] U.S. Cl. ..................................... 222/494; 222/571; 137/512.3; 141/117; 141/302

[56] References Cited

U.S. PATENT DOCUMENTS

| | | | |
|---|---|---|---|
| 591,067 | 10/1897 | Wallace | 222/490 |
| 1,596,520 | 8/1926 | Eskholme et al. | 222/490 |
| 1,947,535 | 2/1934 | Schmidt | 226/97 |
| 2,373,555 | 4/1945 | Folke | 222/490 |
| 2,929,416 | 3/1960 | Farber | 141/117 |
| 3,258,175 | 6/1966 | Taylor | 222/490 |
| 3,895,748 | 7/1975 | Klingenberg | 222/571 |
| 4,139,124 | 2/1979 | Ferrante | 222/110 |
| 4,410,108 | 10/1983 | Minard | 222/571 |

FOREIGN PATENT DOCUMENTS

| | | | |
|---|---|---|---|
| 91390 | 10/1920 | Switzerland | 137/512.3 |
| 914943 | 1/1963 | United Kingdom . | |
| 1080498 | 8/1967 | United Kingdom . | |
| 1182089 | 2/1970 | United Kingdom . | |
| 1236520 | 6/1971 | United Kingdom . | |
| 1357043 | 6/1974 | United Kingdom . | |
| 1394288 | 5/1975 | United Kingdom . | |
| 1401442 | 7/1975 | United Kingdom . | |

*Primary Examiner*—Kevin P. Shaver
*Assistant Examiner*—Gregory L. Huson
*Attorney, Agent, or Firm*—Burns, Doane, Swecker & Mathis

[57] ABSTRACT

A valve unit to be used in a packing machine of the type which manufactures filled and sealed non-returnable packages for dairy products such as milk, yogurt and the like from prefabricated blanks. The packages are filled one at a time by a metering pump and the liquid is fed from the pump to the package via the valve unit. The valve unit includes a check valve and a flexible nozzle which co-operate so as to prevent any after-dripping between pumping strokes. This is achieved in that the check valve with the help of a piston component, after the completed pumping stroke, creates a vacuum in the liquid filled valve unit. This vacuum affects the flexible nozzle so that it closes rapidly and effectively.

11 Claims, 1 Drawing Sheet

VALVE UNIT

This application is a continuation of application Ser. No. 358,705, filed Mar. 16, 1982, now abandoned.

BACKGROUND AND SUMMARY OF THE PRESENT INVENTION

The present invention relates generally to valve units. More specifically, the present invention relates to a valve unit including a flexable nozzle and a valve.

In the manufacture of certain types of non-returnable packages for dairy products the packing containers are filled with the help of metering pumps. Such pumps are usually in the form of piston pumps which at each pumping stroke mete out the desired amount of liquid to a chamber connected to the pump, from where the liquid is transferred to the packing container which is to be filled. In order to prevent afterdripping from the outlet end of the chamber when highly viscous liquids, e.g. yogurt or the like, are pumped, the outlet opening is usually provided at the orifice with a wire screen through which the liquid is pressed by the pump. The wire screen retains the liquid column present in the chamber, not pumped out during the pumping stroke, since owing to the surface tension of the liquid, the same cannot leak out without the active co-operation of the pump. This principle, in general, is working well, but cannot be used, of course, for non-homogeneous liquids, e.g. yogurt with pieces of fruit, nuts or the like. No practical solution of the afterdripping problem with this type of liquids filling has been suggested up to now.

It is one main object of the present invention to provide a valve unit which is particularly suitable to be used in association with non-homogeneous liquids, e.g. fruit yogurt or the like and which is not subject to the disadvantages of the valve units known up to now.

It is a further main object of the present invention to provide a valve unit which is designed so that its function is not hindered by liquids which contain relatively large solid or semi-solid particles.

It is a yet further object of the present invention to provide a valve unit which is easy to clean and which meets the high demands of hygiene.

These and other objects have been achieved in accordance with the invention in that a valve unit including a nozzle and a valve has been given the characteristic that the nozzle is made of a flexible material and is provided with a slit which in the absence of external forces acting upon the nozzle is kept shut through the flexibility of the nozzle. By placing several slits in such a manner that between them they form lugs capable of being folded out, the liquid can pass the nozzle without appreciable resistance on being subjected to the action of the pump. When the pumping stroke has stopped, the flexibility of the nozzle material and the pressure difference between the inside and the outside of the nozzle have the effect that the lugs are folded back again so that the slit-shaped openings are closed. This means that the nozzle is shut so that the liquid column present in the chamber is retained and the risk of afterdripping is eliminated. Since the nozzle does not contain any net or other parts of limited area through which the liquid has to pass, the nozzle is particularly suitable for thick, non-homogeneous products. Furthermore, a nozzle of advantageous fluidic design is obtained which permits a high flow rate and therefore has a high capacity.

In order to reduce further the flow resistance of the nozzle, the nozzle part may be given the form of a compressed tube and be made of a thinner and particularly flexible material. As a result the force which is required to widen the nozzle maximally when the liquid is to pass will be very small, but at the same time there is a greater risk that the nozzle will not shut sufficiently tightly to prevent afterdripping. In accordance with a preferred embodiment of the invention, a flexible nozzle part may be combined with a device adapted so as to change the volume in the chamber at the outlet orifice of which the nozzle is situated. After each pumping stroke the volume of the chamber is reduced, so that a vacuum is created which ensures a rapid and complete closure of the openings of the flexible nozzle. This embodiment of the valve unit in accordance with the invention is particularly suitable for high-capacity filling machines.

Further embodiments of the arrangement in accordance with the invention have been given, moreover, the characteristics which are evident from the description below.

BRIEF DESCRIPTION OF THE DRAWINGS

A preferred embodiment of the unit in accordance with the invention will now be described in detail with special reference to the enclosed schematic drawings which only show the details necessary for an understanding of the invention.

DETAILED DESCRIPTION OF THE PREFERRED EMBODIMENTS

Figure 1:
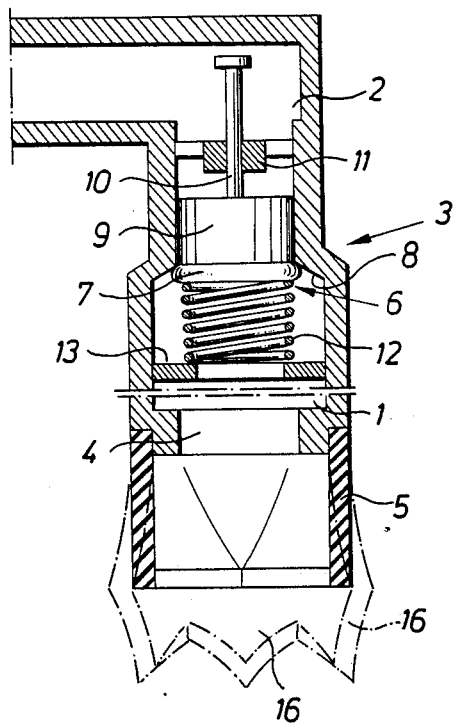
FIG. 1 is a cross-sectional view of a valve unit in accordance with the invention in inactive position, the active position of the nozzle being indicated by dash-dotted lines.

The valve unit shown in FIG. 1 in accordance with the invention includes a chamber 1 which in general is designed as an elongated filling pipe. The chamber is connected via an inlet 2 situated at its top end to a metering pump (not shown), which preferably is in the form of a piston pump with a controllable piston displacement. In the orifice end of the inlet 2 facing towards the chamber 1 is a valve 3, and at the lower end of the chamber 1 there is an outlet 4 which is provided with a closable nozzle 5 made of a flexible material.

The check valve 3 located between the inlet 2 and the chamber 1 includes a valve body 6 which under the effect of the liquid pumped by the piston pump (not shown) is displaceable between a front, open position and a rear shut position. The valve body 6 includes at its lower end facing towards the chamber 1 an annular sealing device 7 which preferably is constituted of an O-ring. The sealing device 7 co-operates in the shut position of the valve 3 with a conical valve seat 8 formed in the passage between the inlet 2 and the chamber 1. At its opposite end facing towards the inlet 2 the valve body 6 is designed as a piston 9, whose diameter is a little smaller than the diameter of the part of the inlet 2 where the piston 9 is situated. The valve body 6 is steered during its movement between the open and shut position by a valve spindle 10, which extends vertically upwards from the upper end of the valve body and is supported so that it can be axially displaced in a valve guide 11 arranged in the inlet. At the lower end of the valve body 6 situated in the chamber 1 there is a valve spring 12 which is in the form of a compression spring placed between the valve body and a spring mounting 13 and is adapted so as to urge the valve body into its upper, shut position.

The valve body 6, as has been said, is urged by the valve spring 12 into its upper shut position when the sealing device 7 rests against the valve seat 8 so that the passage between the inlet 2 and the chamber 1 is wholly shut. The valve spring 12 is chosen so that the force with which the spring acts upon the valve body is smaller than the force, directed oppositely, which the liquid pumped by the metering pump exercizes upon the opposite end of the valve body. As soon as the force of the valve spring 12 has been overcome by the liquid, the valve body 6 is moved towards its lower, open position where the piston has been displaced fully to clear the inlet 2 so that liquid can flow past the piston 9 and into the chamber 1. When the metering pump has completed a working stroke and the liquid flow ends, the valve body is returned directly to the closed position shown in FIG. 1 by the valve spring 12. The function of the valve unit will be described in detail in the following.

Figure 2:
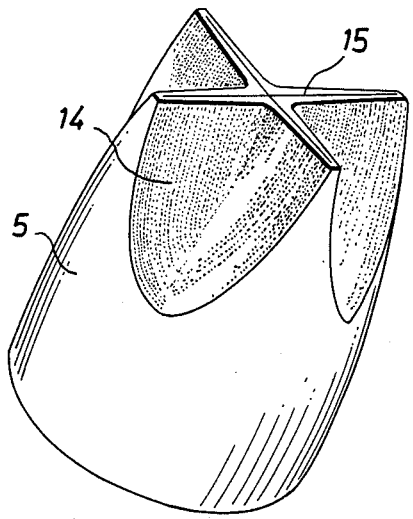
FIG. 2 is a perspective view of the nozzle according to FIG. 1.

The nozzle 5 situated at the lower end of the chamber 1 or filling pipe is made, as mentioned previously, of a flexible material. The nozzle 5 (FIG. 2) is of a substantially cylindrical or truncated cone main shape which however, is disturbed at the lower end of the nozzle 5 by four "folds" or recesses 14 arranged symmetrically, which together give the lower end of the nozzle the form of a cross (seen from the end face of the nozzle). At the lower end of the nozzle are two slits which are symmetrical and cross each other at a right angle. Between the slits 15 the recesses 14 form four (substantially triangular) lugs 16 which, because of the flexibility of the material, are capable of being folded out to an open position, indicated by dash-dotted lines in FIG. 1, when the liquid passes through the nozzle 5. In the absence of external forces, such as those caused by the liquid for example, the slits 15 are held shut, however, through the flexibility of the material, so that the lugs 16 are in the position shown in FIG. 2.

In order to obtain a nozzle 5 of the flexibility appropriate for the purpose it has been found advantageous to manufacture the nozzle from soft plastics or rubber of a hardness of 25°–40° Shore. Since the arrangement is intended first and foremost for dairy products it is necessary moreover to select a material which is suitable to be used jointly with foodstuffs, e.g. nitrile or silicone rubber.

When the valve unit in accordance with the invention has been mounted in a packing machine and is used for the filling of open packing containers conveyed below the chamber 1 or filling pipe, the liquid is delivered, as mentioned previously, by a metering pump via the inlet 2. From the initial position shown in FIG. 1 the valve body 6 is acted upon by the liquid pressed forward, and as soon as the pressure in the inlet 2 exceeds the force with which the valve spring 12 presses the valve body 6 into the shut position the valve body is pushed downwards in FIG. 1 until the upper end of the piston 9 has wholly cleared the inlet 2, so that liquid can flow past the piston 9 and into the chamber 1. The valve body remains in this position during the working stroke of the pump and the liquid passes through the chamber 1, via the outlet 4 and the nozzle 5 down into the packing container situated below the nozzle (not shown). As soon as the valve 3 has been opened, the pressure in the chamber 1 acts upon the flexible nozzle so that the lugs 16 are folded outwards and the slits 15 are widened. The recesses or folds 14 of the nozzle are more or less flattened out as the nozzle is distended and an opening of substantially circular shape and the required area is produced (illustrated by dash-dotted lines in FIG. 1). In this position the liquid can flow without appreciable resistance through the nozzle 5, since the force it takes to widen the flexible nozzle and to open the lugs 16 is very small and in practice wholly negligible.

To ensure that in spite of its flexibility the nozzle 5 shuts again and closes tightly when the working stroke of the metering pump has been completed, a vacuum is created in the chamber 1 with the help of the valve 3. As a result, the lugs 16 are firmly pressed together so that the slits 15 are completely closed and no liquid can pass. More particularly, after the completed pumping stroke, the pressure in the inlet 2, as well as in the chamber 1, will drop. This is achieved owing to the valve spring 12 being able to take the valve body back in the direction of the shut position. During the return movement in the first place the upper end of the piston 9 will enter into the portion of the inlet 2 co-operating with the piston, so that the connection between the inlet 2 and the chamber 1 is interrupted. The continued movement of the valve body 6 upwards into the inlet 2 will cause the volume of the chamber 1 to increase, with the consequence of a vacuum being produced in the liquid present in the chamber, this vacuum acting upon the flexible nozzle 5 and sucking together its opening lugs 16, so that they press tightly against each other and completely prevent any afterdripping. After further upwards movement the valve body 6 reaches its uppermost position when the sealing device 7 rests against the valve seat 3 so that the valve 3 is completely shut. In this position a vacuum continues to prevail in the chamber 1, which means that the liquid column present in the chamber securely remains in the chamber until at the next working stroke of the metering pump the valve 3 once more commences to open.

The design of the nozzle 5 may vary within wide limits within the scope of the invention. Thus, for example, the number and design of the slits 15 may vary, likewise the principal shape of the nozzle, provided the functions described remain unchanged. A particularly advantageous and simple design of the nozzle is achieved if the nozzle is cast in the form of a tube which at the one end is pressed together (radially) from three or four (or more) directions. When the nozzle opens for the liquid, it can be opened very easily to a practically completely circular cross-sectional form, especially if it is made of a thin and very flexible material which is made possible in accordance with the invention by the nozzle not operating as a check valve co-operating directly with liquid pumps but via the spring-loaded valve, which limits the stresses on the nozzle at the return stroke of the pump. Moreover, the flexibility of the nozzle material can be varied and adapted to the type of liquid the nozzle is to work with. For reasons of hygiene the nozzle has to be changed at regular intervals, but this can be done at low cost, since the costs of manufacturing the nozzle are very low.

The nozzle in accordance with the invention and especially the combination described of nozzle and valve provides a valve unit which, thanks to the built-in return suction function, securely retains the liquid in the chamber during the return stroke of the metering pump and thus prevents afterdripping and spilling during the filling of individual packing containers. The valve unit operates automatically and is controlled by the liquid flow, so that the valve unit does not make the packing machine appreciably more complicated or more expensive.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not as limiting to the scope and spirit of the invention as set forth in the appended claims.

What is claimed is:

1. A valve unit comprising:
   valve body means having a valve chamber, an inlet duct and an outlet duct;
   a flexible material nozzle secured over said outlet duct of said valve body means, said nozzle being provided with a slit-like opening which opens in response to fluid pressure in said valve chamber and which is resiliently biased into a closed position; and
   means within said valve chamber for sealing closed said inlet duct and for changing the volume of the valve chamber, said sealing and changing means being biased so as to seal off said inlet duct and to increase the volume of the valve chamber when the fluid pressure upstream of the inlet duct falls below a predetemined level, thus reducing the fluid pressure in said valve chamber and closing said opening rapidly.

2. A valve unit suitable for feeding non-homogeneous liquid-solid mixtures comprising:
   a valve chamber including an inlet duct and an outlet duct;
   a piston slidably mounted in the valve unit and movable between a first position closing off said inlet duct from said valve chamber and a second position communicating said inlet duct with said valve chamber and said outlet duct;
   a nozzle, a first end of which is secured over said outlet duct, a second end of said nozzle being resiliently biased into a closed position and being opened by a pressure force developed by the liquid-solid mixture when said pressure is exerted on the liquid-solid mixture present in said valve chamber and said outlet duct; and
   resilient means for continuously biasing said piston towards said first position, a biasing pressure of said resilient means being overcome by said pressure exerted on the liquid-solid mixture moving said piston to said second position and opening said nozzle, wherein when said pressure is no longer exerted on the liquid-solid mixture, said resilient means will urge said piston back towards said first position thereby creating a partial vacuum in said nozzle to assist in closing said nozzle.

3. A valve unit comprising:
   a valve body having a valve chamber with an inlet and an outlet;
   a tubular nozzle of flexible material positioned over said outlet, said nozzle being biased toward a collapsed position closing said outlet; and
   piston means for opening and closing said inlet, said opening and closing means increasing the volume of said valve chamber when closing said inlet so to reduce the pressure in the valve chamber and collapse said nozzle.

4. The valve unit of claim 3, wherein the piston means is reciprocable in said inlet.

5. A valve unit comprising:
   valve body means including an inlet duct, and outlet duct, a valve chamber communicating said inlet duct with said outlet duct, and piston means for changing the volume of said valve chamber and for opening and closing said inlet duct, said piston means increasing the volume of said valve chamber when closing said inlet duct; and
   a flexible material nozzle secured over said outlet duct, said nozzle being provided with a slit-like opening which is resiliently biased into a closing position, whereby said flexible material nozzle closes responsively with the closing of said inlet duct.

6. The valve unit of claim 5, wherein said slit-like opening of the nozzle has at least two slits which between them form lugs capable of being folded out by a pressurized liquid passing through the nozzle.

7. The valve unit of claim 6, wherein the nozzle is in the form of a tube, one end of which is resiliently biased into a closed position from at least three directions.

8. The valve unit of claim 7, wherein the nozzle is made of rubber of a hardness of 25°–40° Shore.

9. The valve unit of claim 5, wherein said piston means is provided with a sealing device which is adapted so that it seals off the inlet duct from the valve chamber.

10. The valve unit of claim 9, wherein the piston means is movable into said valve chamber to an open position, which permits fluid passage between the inlet duct and the valve chamber, and out from said valve chamber to a shut position in which the sealing device contacts an edge of the inlet duct, said edge being a valve seat.

11. The valve unit of claim 10, wherein said valve body means further includes a spring element provided in said valve chamber and adapted to urge the piston into said shut position, wherein the force with which the spring element acts upon the piston is smaller than the force which the liquid flowing through the inlet opening exercises upon the piston.

* * * * *